United States Patent
Brennan et al.

(10) Patent No.: US 8,027,845 B2
(45) Date of Patent: Sep. 27, 2011

(54) BUSINESS ENABLEMENT METHOD AND SYSTEM

(75) Inventors: Anthony Clive Lincoln Brennan, Lindfield (AU); Elissa Glass, Erskineville (AU)

(73) Assignee: International Business Machines Corporation, Armonk, NY (US)

(*) Notice: Subject to any disclaimer, the term of this patent is extended or adjusted under 35 U.S.C. 154(b) by 436 days.

(21) Appl. No.: 11/741,815

(22) Filed: Apr. 30, 2007

(65) Prior Publication Data

US 2008/0270448 A1   Oct. 30, 2008

(51) Int. Cl.
*G06Q 10/00* (2006.01)
(52) U.S. Cl. .......................................................... 705/1.1
(58) Field of Classification Search .................... 705/1.1
See application file for complete search history.

(56) References Cited

U.S. PATENT DOCUMENTS

| | | | |
|---|---|---|---|
| 5,875,431 A | 2/1999 | Heckman et al. | |
| 6,138,139 A * | 10/2000 | Beck et al. ...................... | 709/202 |
| 6,785,805 B1 * | 8/2004 | House et al. ....................... | 713/1 |
| 2002/0035483 A1 * | 3/2002 | Patel ................................. | 705/1 |
| 2002/0069083 A1 * | 6/2002 | Harter et al. ....................... | 705/1 |
| 2002/0099563 A1 * | 7/2002 | Adendorff et al. ................. | 705/1 |
| 2002/0133368 A1 * | 9/2002 | Strutt et al. ........................ | 705/1 |
| 2003/0069869 A1 | 4/2003 | Gronau et al. | |
| 2003/0122875 A1 * | 7/2003 | Linder ........................... | 345/771 |
| 2003/0126050 A1 * | 7/2003 | Theiss et al. .................... | 705/35 |
| 2003/0130884 A1 | 7/2003 | Michaluk | |
| 2003/0187707 A1 * | 10/2003 | Hack et al. ......................... | 705/7 |
| 2004/0098292 A1 * | 5/2004 | Miller et al. ....................... | 705/8 |
| 2004/0220843 A1 | 11/2004 | Walter | |
| 2005/0065904 A1 | 3/2005 | DeAngelis et al. | |
| 2005/0203757 A1 | 9/2005 | Lei et al. | |
| 2005/0222883 A1 | 10/2005 | Goldberg et al. | |
| 2006/0085255 A1 | 4/2006 | Hastings et al. | |
| 2006/0100945 A1 | 5/2006 | Macy et al. | |

(Continued)

FOREIGN PATENT DOCUMENTS

WO   0248935 A1   6/2002

OTHER PUBLICATIONS

Giaglis M. George International Journal of Flexible Manufacturing Systems vol. 13, No. 2, 209-228, "A Taxonomy of Business Process Modeling and Information Systems Modeling Techniques".*

(Continued)

*Primary Examiner* — John W Hayes
*Assistant Examiner* — Tonya Joseph
(74) *Attorney, Agent, or Firm* — Schmeiser, Olsen & Watts; John Pivnichny

(57) ABSTRACT

A business enablement method and system. The method includes identifying and retrieving business management data associated with the business. The business management data is mapped to a structure comprised by a business management model. The business management data is categorized into a standard informational structure. An intranet viewable interactive model of the business management data is generated. The business management data is mapped to key result areas of the business. The business management data is integrated with business computing systems. The business computing systems receive reports comprising the business management data mapped to the key result areas of business. The reports are reviewed to determine a status of the business management data. The business management data is improved and displayed.

3 Claims, 12 Drawing Sheets

U.S. PATENT DOCUMENTS

2006/0106825 A1    5/2006  Cozzi
2009/0112663 A1*   4/2009  Benayon et al. .................. 705/7

OTHER PUBLICATIONS

Business Excellence Architects; 2006; http://www.busxarchitects.com/WebPages/Bustools.htm; 6 pages.

LegaSuite Business Process Management (BPM): Legacy-Aware BPM and Workflow for the SOA Enterprise; 2003-2006 Seagull Software Systems, Inc.; http://www.seagullsw.com/products/bpm.html; 2 pages.

Final Office Action (Mail Date Jun. 13, 2011) for U.S. Appl. No. 11/746,690—Filing Date May 10, 2007; Confirmation No. 3112.

(W02000042553) Method AD Apparatus for Processing Business Inforamtion From Multiple Enterprises; Gardepe, Carla, E.: Jul. 20, 2000.* *As cited by Examiner in PTO892 filed in U.S. Appl. No. 11/746,690.

* cited by examiner

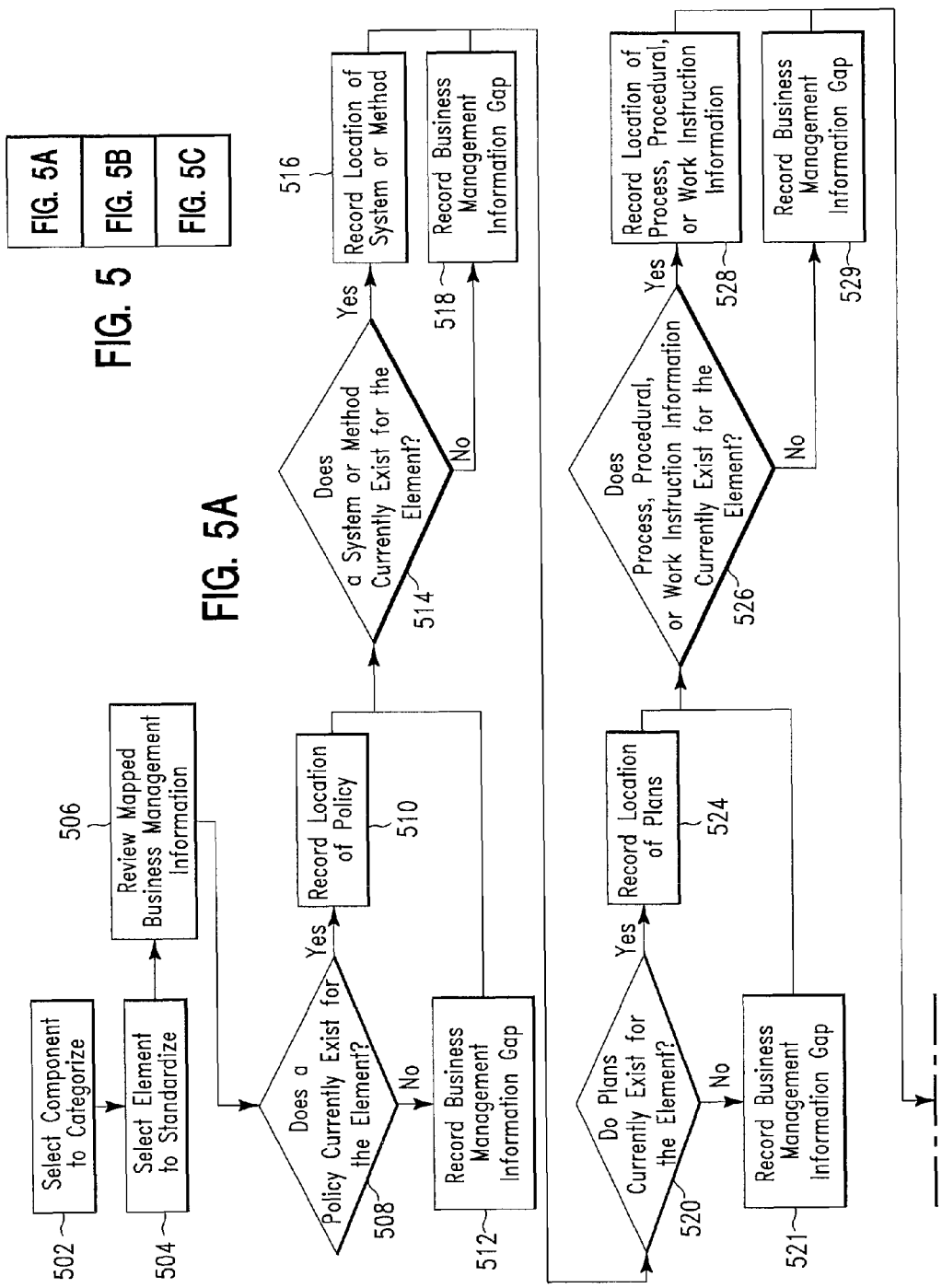

BUSINESS ENABLEMENT METHOD AND SYSTEM

FIELD OF THE INVENTION

The present invention relates to a method and associated system for providing a business with a view of the systems, subsystems, policies, and processes that comprise the business management system of the business.

BACKGROUND OF THE INVENTION

Managing and maintaining the business management data of an organizational structure of an entity typically comprises a complicated and inefficient process with little flexibility. Accordingly, there exists a need in the art to overcome the deficiencies and limitations described herein above.

SUMMARY OF THE INVENTION

The present invention provides a method for generating a business management system within a business, said method comprising:

identifying and retrieving business management data associated with said business;

first mapping said business management data to a structure comprised by a business management model;

categorizing said business management data into a standard informational structure;

evaluating said business management data using said standard informational structure;

generating and displaying an intranet viewable interactive model of said business management data;

second mapping said business management data to key result areas of said business;

integrating said business management data with business computing systems;

receiving, from said business computing systems, reports comprising said business management data mapped to said key result areas of said business;

reviewing said reports to determine a status of said business management data;

improving said business management data; and displaying said improved business management data.

The present invention advantageously provides a method and associated system capable of managing and maintaining the business management data of an organizational structure.

BRIEF DESCRIPTION OF THE DRAWINGS

FIGS. 5A-5C illustrate a flowchart detailing a third step of the flowchart of FIG. 2, in accordance with embodiments of the present invention.

DETAILED DESCRIPTION OF THE INVENTION

Figure 1:
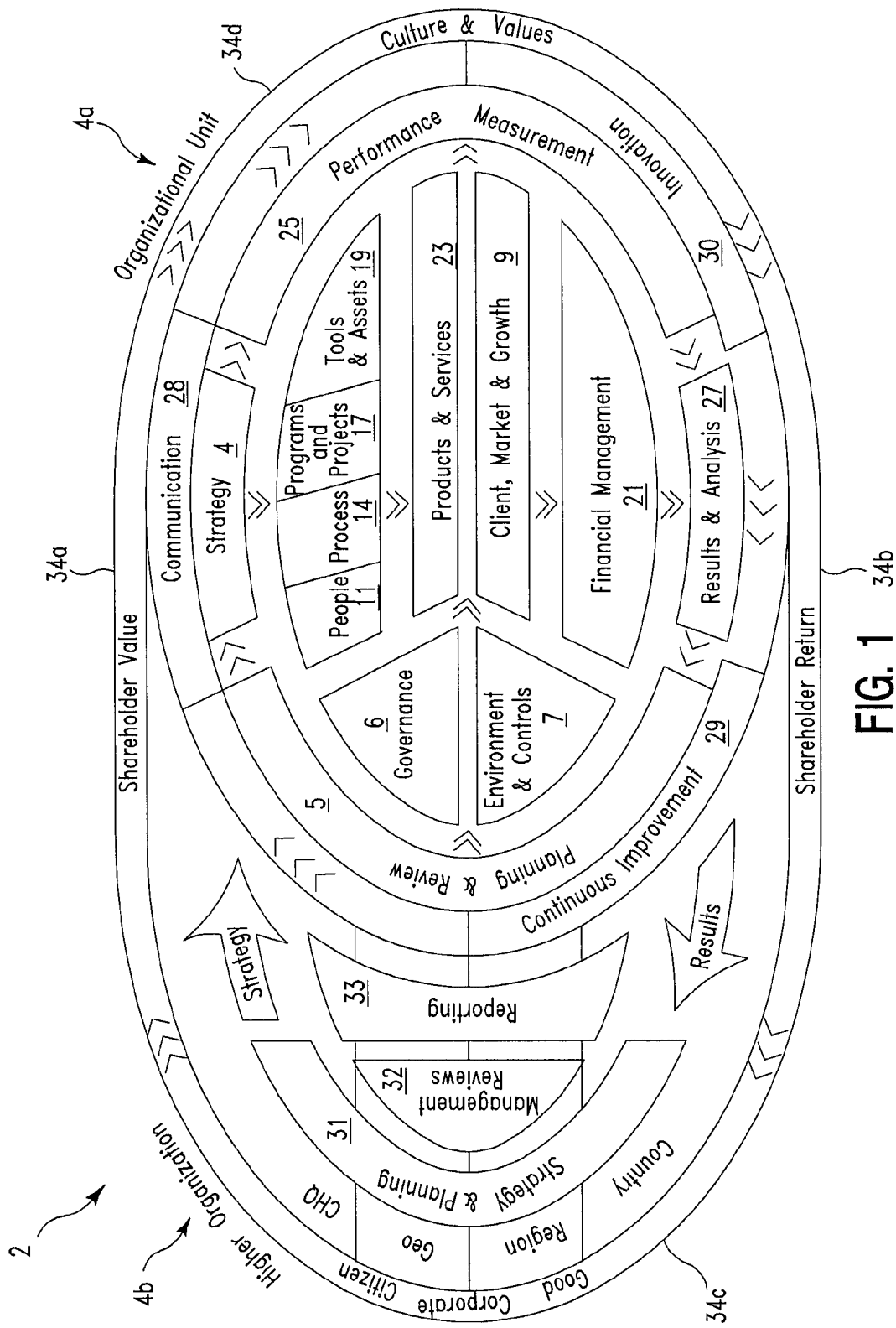
FIG. 1 illustrates a business enablement system model for use within a business enablement system, in accordance with embodiments of the present invention.

FIG. 1 illustrates a Business Enablement System model 2 for use within a Business Enablement System, in accordance with embodiments of the present invention. The Business Enablement System (BES) comprises the BES model 2 and a development method (i.e., see the process FIG. 2) that when deployed provides an organization with a holistic end-to-end view of the systems, subsystems, policies, and processes that constitute a business management system of the organization. The BES model 2 depicts key components and elements of internal, external, financial, operational, strategic, and tactical perspectives of an organization and organizational structures within two distinct tiers: an organizational unit tier 4a and a higher organization tier 4b:

1. Organizational unit tier 4a—Within this tier, an organization defines strategic, tactical, managerial and operational systems, policies, and processes required for direction, management, control, and performance of the organization's end-to-end activities.
2. Higher Organization tier 4b—Within this tier, an organization defines the strategic and managerial systems, policies, and processes required (either mandated or cascaded) by the higher organizational structures to the organizational unit. The higher structures may be operationally, geographically, or financially constructed. For example, the higher structures may comprise legal or governmental authorities, parent or holding companies, a board of directors and shareholders, an owner, a director, etc.

Within the organizational unit tier 4a, the BES model 2 identifies 16 key components in the following business management categories:

1. Business driver components
2. Business enabler components
3. Business outcome area components
4. Products or services components
5. Supporting components Within the Higher Organization tier 4b, three components and 4 elements are identified within the following categories:

1. Higher organization alignment areas
2. Cross-organizational priorities

When deployed as a single end-to-end system view of an organization's business management system, this two-tiered framework serves to centralize all business management systems, policies, processes, and tools used by an organization.

The BES development method (i.e., see algorithm of FIG. 2) describes a technique for developing this single end-to-end system view of an organization's business management system, using the BES model 2 as the keystone to the implementation. This is achieved via a six-phase approach described in the flowchart of FIG. 2 and described on page 21, infra:
1. Identify
2. Centralize
3. Standardize
4. Evaluate
5. Enable
6. Measure & Improve.

Figure 2:
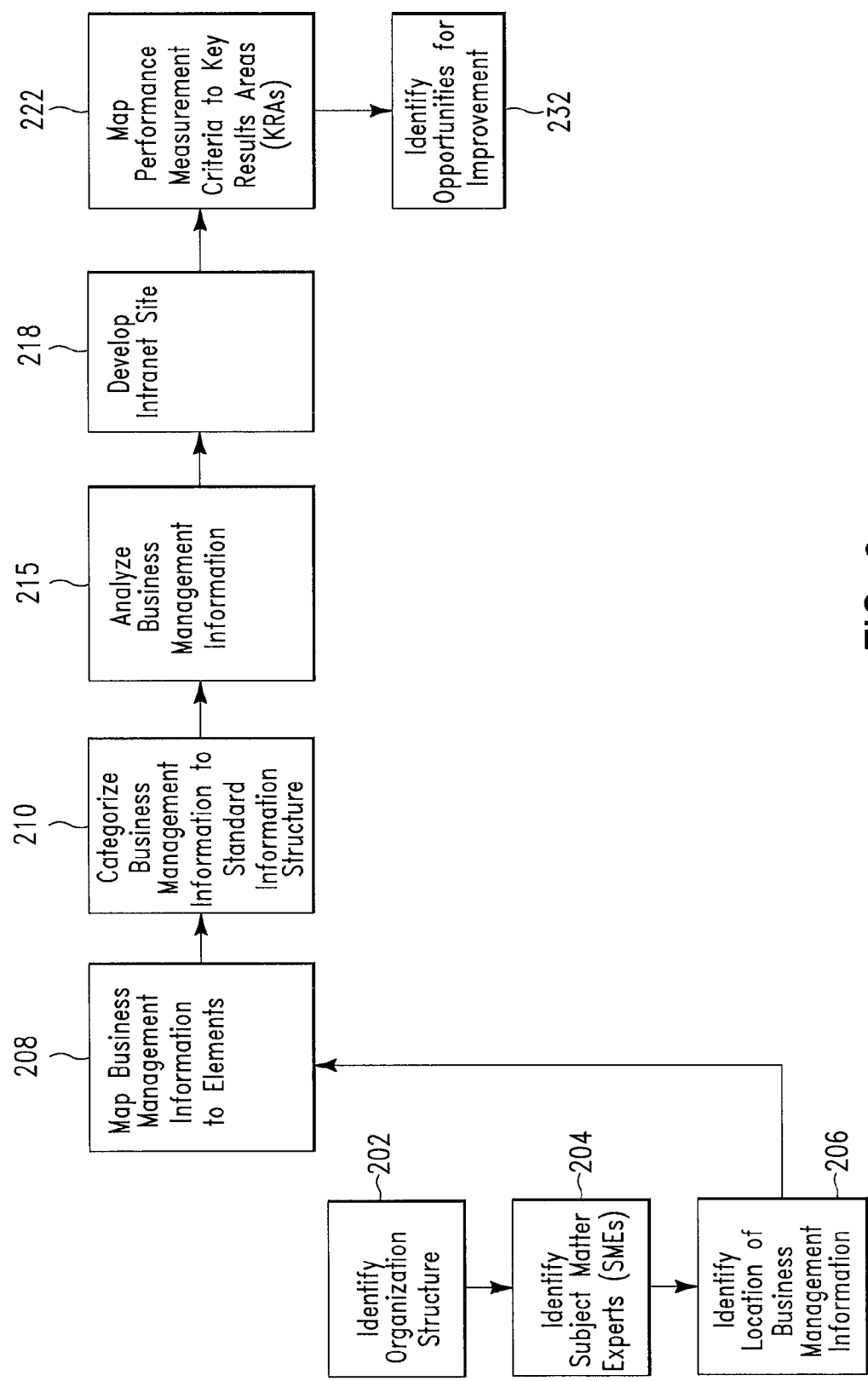
FIG. 2 illustrates a flowchart describing a high level view of a development method using the model of FIG. 1, in accordance with embodiments of the present invention.

When deployed and executed, the BES model 2 and the development method of FIG. 2 provide visibility to the systems, subsystems, policies, and processes executed by an organization in order to manage, monitor, and control end-to-end business activities. Such visibility provides transparency to the decision-making activities of an organization and facilitates an organization's ability to operate efficiently.

Business Driver Components

Business driver components are fundamental to the BES. The systems, policies, and/or processes that define how an organization performs activities within these key components (i.e., of the business drivers) are crucial to the execution of business and business management.

An organization typically requires accurate and current policies and plans to describe its business activities within the following 5 components of the business drivers:
1. Strategy component 4
2. Planning & Review component 5
3. Governance component 6
4. Environment & Controls component 7
5. Client, Market & Growth component 9

The policies, plans, and processes defined by an organization within these business driver components provide the organization with:
1. Clear strategic and operational direction
2. A business planning and review methodology
3. Decision-making, functional, and operational structures, including role, responsibility and accountability descriptions
4. A safe and secure working environment
5. An accurate understanding of its clients and customers, the broader community, and the marketplace.

1. Strategy Component 4

The Strategy component 4 is a key driving component of the BES. The Strategy component 4 describes an organization's vision and mission and the objectives (or goals) that are aligned to the core business strategies and success factors of the business. The Strategy component 4 is fed by the strategic planning of an organization and the strategic objectives of its higher organizational structures in order to provide required value to the organization and its other stakeholders.

2. Planning & Review Component 5

The Planning & Review component 5 of the BES describes how an organization and its business areas are positioned and how business planning is executed in order to achieve the organization's business strategy. The Planning & Review component 5 identifies the policies, methods, and processes used to plan, develop, execute, and continually review the business strategy of an organization. This includes the identification and management of both business investments and business risks in order to maintain the success and sustainability of the organization. The Planning & Review component 5 directly feeds the Strategy component 4 of the BES and is also particularly focused on the Client, Market & Growth component 9 as both components are key drivers of an organization. An organization's understanding of the external business environment (clients, customers, competitors, the wider community, and the marketplace) is integral to the development of a business strategy and the planning for deployment and achievement of the strategy.

3. Governance Component 6

The Governance component 6 is another key driving component of the BES as it is the system that controls, directs, and enables an organization to meet its stated goals or objectives. The Governance component 6 focuses on the leadership, management, organizational control, and execution capabilities of an organization that allow it to set and achieve objectives, assess and monitor risk, deliver goods and/or services, and perform in a viable and sustainable manner. Each organization's system of governance identifies the decision-making tasks (or, decision-making areas) that are controlled, directed, and managed to enable the achievement of the organization's objectives and required business outcomes. Collectively, these tasks form the systematic pattern of behavior driven by the Strategy component 4, and governed and supported by a defined set of values, policies, processes, controls, measures, and results that is the decision-making framework for the organization. The Governance component 6 demonstrates how an organization is structured to promote a system of business leadership across all business areas in order to encourage decision making and to support performance and improvement objectives.

4. Environment & Controls Component 7

The Environment & Controls component 7 focuses on the working environment of the organization, including the physical and logical security and safety policies of the business. This component describes how business controls and compliance activities are performed across the organization. Additionally, the Environment & Controls component 7 describes how required standards are satisfied and how business control measures are developed and applied. This component of the BES also describes the working environment within which the other components of the BES operate (i.e., within which people work and products and services are delivered). The Environment & Controls component 7 is closely aligned to the capability or enabling components of the BES. In particular, the People component 11, the Process component 14, the Programs & Projects component 17, and the Tools & Assets component 19. Business controls, compliance, and working environment activities are defined in this component and then executed by the people of the organization using the tools and assets of the organization via defined programs, projects and processes.

5. Client, Market & Growth Component 9

The Client, Market & Growth component 9 comprises the needs and expectations of an organization's clients and customers (current and future) and the external environment that is the marketplace. An organization's knowledge of its clients, customers, and markets, the way it manages its relationships with them, and the way in which clients, customers, and the marketplace perceive the organization are vital to an organization's success as a business. The Client, Market & Growth component 9 of the BES defines the focus an organization places on its client's and customer's place in the market and the broader community and additionally describes how it manages client satisfaction, client needs, expectations, and client relationships. The methods an organization employs to grow its business, including the development and management of products, services, offerings, solutions, proposals etc are elements of this component. The Client, Market & Growth component 9 also describes the methods used to analyze market information, an organization's own business reputation, the impact of the organization within the broader community, and government and legal considerations, in order to produce the best business results for the organization.

Business Enabler Components

In order to develop and/or deliver products and services, an organization requires capability. Capability may constitute any leased, purchased, employed, invented or refined resource, skill, tool, asset, methodology, or technology that enables an organization to develop and/or deliver its products and services. Additionally, a methodology to manage the financial requirements of leasing, purchasing, or employing these capabilities is essential to the management of a business. The systems, policies, and processes that describe how an organization provides direction, manages, and controls these business enablers are defined in the following 5 components of the business enablers:

1. People component 11.
2. Process component 14.
3. Programs & Projects component 17.
4. Tools & Assets component 19.
5. Financial Management component 21.

1. People Component 11

The People component 11 enables an organization to achieve its goals. A supportive organizational culture that motivates and recognizes its members will, in turn, encourage and enable the contribution of individuals and teams to improve the performance of the organization. The People component 11 identifies the programs concerned with motivation and recognition of an organization's members. This component also describes the policies and programs put in place to optimize the well-being of people within the working environment, including the working culture to which all members contribute. The People component 11 also identifies the management methods used to employ, manage, train, educate, and skill people to allow them to meet their responsibilities and to achieve both organizational and individual objectives.

2. Process Component 14

Fundamental to the delivery of products and services, the Process component 14 is at the core of the BES. Processes interpret the activities performed throughout an organization. Processes also guide the management and ability of an organization to achieve its strategic objectives and required business outcomes. The Process component 14 is supported by the Continuous Improvement element 29 of the BES, in order to ensure the currency, relevance, and success of all released processes within the operational environment.

3. Programs & Projects Component 17

As one of the capability (or enabling) components of the BES, the Programs & Projects component 17 is at the core of the system. Program and project management guides the capabilities of an organization to achieve its business outcomes. Program and project management methods are used to perform and deliver the activities and outcomes that an organization is required to achieve.

4. Tools & Assets Component 19

The Tools & Assets component 19 comprises those items, systems, and processes developed and/or deployed by an organization to achieve its business outcomes. Driven by strategy and the needs of customers, clients, other stakeholders, and the organization itself, the Tools & Assets component 19 facilitates the delivery of an organization's products and services. This component of the BES identifies the methods used to develop, evaluate, manage, and secure an organization's tools, technology infrastructure, and other assets. It also provides access to the policies, processes, and tools used to protect, maintain, and manage resources and physical and logical assets.

5. Financial Management Component 21

Financial data and information is required to support decision making across the organization. Integral to the Performance Measurement component 25, financial data is analyzed and interpreted to produce financial (and other) information that typically indicates varying levels of performance, identifies trends, supports financial risk management and decision making, and facilitates business improvement.

Products & Services Components

The Products & Services component 23 describes what an organization provides, produces, develops, and/or delivers to its clients and customers. Unlike the other components and elements of the BES, this component does not describe systems, policies, or processes. Its purpose is solely to provide a clear description of the products and/or services of the organization. Driven by strategy, policy, planning, clients/customers, and the marketplace—and enabled by people, programs, processes, projects and tools—the development and/or delivery of products and services is the goal of the combined effort of all components. Consequently, the systems, policies and processes that describe these business activities are provided in their respective BES components.

Business Outcome Components

Business Outcome components describe actual performance of an organization. This includes direction, management, and control of the data and information used to identify, measure, analyze, and report on an organization's performance goals, operational activities, and strategic objectives. The systems, policies and processes defined by an organization in order to manage data and information, establish performance indicators, measure performance, produce reports, and analyze performance are provided in the following 2 components:

1. Performance Measurement component 25
2. Results & Analysis component 27

1. Performance Measurement Component 25

The Performance Measurement component 25 involves the setting of organizational performance indicators, the definition of measurement and achievement criteria, and analysis of the reported status of defined performance areas. This component of the BES is closely aligned to the Strategy component 4, the Governance component 6, and the Results & Analysis component 27 of the system: business objectives are described in the organization's business strategy; responsibility for the execution of business objectives are described in the business governance framework; and performance indicators that represent the endorsed business objectives are developed using the methods described in this component. The status of an organization's performance indicators are then reported—and performance across the business is analysed—using the methods described in the Results and Analysis component 27. The status of all performance indicators and the organization's reported results, together with corresponding analysis, form the basis of the organization's business strategy planning and review cycles.

2. Results & Analysis Component 27

This component of the BES focuses on outcomes. The other components of the system work together to achieve strategic objectives and business outcomes and in this component these outcomes are analyzed and reported. The activities performed within the other components of the BES and the interrelationships between them are reported in this component. In addition, data and information from the other components is collected, interpreted, and presented in the form of reports that communicate the results and varying levels of success of each area of the organization. These reports are used to inform and support decision-making across the organization. This component additionally defines the processes and systems used to analyze reported status. The activities described in this component drive and support the organization's business strategy and structure of business governance and provide key inputs to the organization's planning and review cycles by providing information that can identify trends, enable reliable predictions and support risk management, decision-making, and continuous performance improvement.

Supporting Components

The BES is supported by three specific components that reach across and through each of the key components of the system. These supporting components enhance, shape, and align each of the key components into a unified whole that mobilizes and enables an organization to achieve strategic and business objectives.

1. Communication Component 28

Effective communication is required by an organization to ensure that team members receive information when they need it and disseminate information that is both timely and appropriate for the needs of the greater organization. Communication systems across an organization are required to work vertically up and down the management hierarchy and horizontally between organizational units, business areas, functional structures, and administrative areas. As a supporting component of the BES, an organization's communication paths should allow its members to regularly demonstrate management commitment and involvement in processes and programs; raise awareness of policies, goals, and programs; provide information; deal with concerns; and encourage participation and feedback from all team members.

2. Continuous Improvement Component 29

Continuous Improvement is the methodology used by an organization to manage and improve processes and to implement programs to enhance the effectiveness and efficiency of the organization. This component therefore identifies the systems, policies, and processes employed by an organization to improve its operational and administrative systems. Continuous Improvement is closely aligned to the Process component 14 of the BES. At the core of the system, the Process component 14 is constantly supported by the Continuous Improvement component in order to ensure the currency, relevance, and success of all systems, policies, and processes within the operational and administrative environment.

3. Innovation Component 30

As a supporting component of the BES, the Innovation component 30 describes the systems, policies, processes, and tools that an organization uses to identify, assess, and implement creative and innovative thought in order to: identify new products, services, and solutions; grow its business; better satisfy and serve shareholders, clients, customers, the greater community, and/or other stakeholders; and realize an organizational vision. Key to the capture and use of innovative thought is the management of the collective knowledge of an organization and its people. Knowledge management is therefore an important element of this BES component.

Higher Organization Alignment Areas

The BES is implemented at organizational level, however organizations are often accountable to a higher organizational structure. The higher organizational structure may be operationally, geographically, or financially constructed. For example, legal or governmental authorities, parent or holding companies, boards of directors and shareholders, an owner, or director. Whether a large organization or small, these higher organization components are required to describe the strategies, plans, and reviewing and reporting systems of the higher organizational structure, while the other components of the BES work to achieve these strategies and plans. In order to control, direct, and enable execution of its strategy and plans, the higher organization establishes strategic planning processes, reviewing systems, and reporting requirements to:

1. Align the business strategies of organizational units with the strategy and plans of the higher organization.
2. Provide a meeting and review structure where business decisions are made to improve or enhance the current strategy. Feedback on the performance of the organization is given.
3. Enable the use of a common business and performance management language across the greater organization.
4. Promote shared understanding across the breadth of the organization.
5. Facilitate decision-making that benefits the greater organization.
6. Encourage the replication of successful business and performance management techniques across the greater organization.

1. Strategy & Planning Component 31

In this component of the higher organization tier 4b, the business strategy and expansive plans of the greater organization are developed. These strategies and plans may be referred to as required business outcomes (RBOs). RBOs are typically passed to the organization in the form of plans and targets. Whether presented to the greater organization as RBOs or a more broad competitive strategy, each organizational unit then translates these objectives and outcomes into its own strategy (i.e., via the Strategy component 4) in order to make the strategy, plans, and/or RBOs of the higher organization operational. In order to provide this required value to the organization (and/or its shareholders and other stakeholders), the higher organization is responsible for implementing the following business management activities across the greater organization:

1. Business strategy.
2. Strategy leadership.
3. Strategic planning.

2. Management Reviews Component 32

The executive and management reviews of the higher organization are identified in this component. These reviews will vary from organization to organization, however, a typical example would be:

1. Strategy meetings/reviews.
2. Operational meetings/reviews.
3. Quarterly meetings/reviews.
4. Regional meetings/reviews.
5. Team briefings.
6. Individual performance briefings.

This is where decisions are made in order to improve or enhance the current strategy and feedback on the performance of the organization is provided by the higher organization. During reviews, organizational performance reports (as described in the Reporting component 33 of the higher organization tier 4b, infra) are reviewed, assessed, and discussed at the higher level of the organization. Business management decisions made during executive and management reviews are typically those that most profoundly affect the strategy of the entire organization. These decisions are then passed to the organizational units to be made operational.

3. Reporting Component 33

The business results of an organization are presented in organizational performance reports. Reports are the output of the organization's performance measurement, assessment, and status monitoring systems and typically incorporate business analyses. Scorecards, strategy maps, and other methods of reporting performance are developed by organizational units and reviewed by the higher organization tier 4*b* during executive and management reviews (See the Management Reviews component 32). Results and analysis illustrate the varying levels of achievement across the organization and the proposed change required together with financial results (where required) in order to reveal the extent to which change can be implemented. The higher organization tier 4*b* uses reports to compare performance within and across organizational units in order to understand what is currently being achieved by the organization and to determine what needs to be achieved in the future. The higher organization tier 4*b* additionally uses the data and information presented in reports to: make decisions affecting the breadth of the organization; decide when to make required changes to the direction of the organization; and determine when to continue to pursue the current competitive strategy.

Cross-organizational Priorities

Across the length and breadth of an organization, the behavior of its members and the general manner or tone with which business is conducted is guided by its cross-organizational priorities. Typically differing from strategic, financial, or operational priorities, cross-organizational priorities are those that most heavily influence the way an organization and its members conduct their day-to-day business activities. Cross-organizational priorities are those that guide all decisions made by members of an organization and vary from organization to organization. These priorities are intended to permeate the organization and describe the organization's broad approach to addressing the priority areas of for example:

1. Shareholder value 34*a*.
2. Shareholder return 34*b*.
3. Commitment to being a good corporate citizen 34*c*.
4. Culture & values 34*d*.

FIG. 2 illustrates a flowchart describing a high level view of a BES development method using the BES model 2 of FIG. 1, in accordance with embodiments of the present invention. The BES development method describes a technique for developing a single end-to-end system view of an organization's business management system. The objective of the BES development method is to describe how an organization may develop a centralized, intranet-based system that provides access to its business systems, subsystems, policies, and processes (i.e., business management information) in order to create an end-to-end business management system. In steps 202, 204, and 206 the method describes how an organization may initiate this development and application of the BES model 2 (i.e., as described, supra) to its own organization. In step 202, an organization structure is defined. In step 204, subject matter experts (SMEs) are identified. During step 204, a consultant works with the organization's executive or leadership in order to identify at least one member of the organization who can describe the organization's approach to the direction, control, management, and execution of each of the following components of list 1 that map directly to the components of the organization's BES being implemented:

List 1
1. Strategy
2. Planning & Review
3. Business Governance
4. Environment & Controls
5. Client, Market & Growth
6. People
7. Process
8. Programs & Projects
9. Tools & Assets
10. Financial Management
11. Performance Measurement
12. Results & Analysis
13. Products & Services
14. Communication
15. Continuous Improvement
16. Innovation
17. Higher Organization
18. Cross-organizational priorities.

In step 206, a location for business information defining each of the components of list 1 is identified. The consultant works with each SME identified in step 204 in order to identify a current location of the systems, subsystems, policies, processes and tools (i.e., the elements of list 1). At each activity, the consultant works with each SME to identify an electronic or hardcopy location of each element of business management information and records the details. During step 206, the consultant requests that each SME identifies any known interactions with the higher organizational unit. Additionally, the consultant queries each SME's understanding of any cross-organizational priorities. These additions to the body of knowledge imparted by the SME will enable the consultant to identify all instances of reporting and review across the organization and will help identify the extent of influence of the organization's stated priorities amongst its own members.

In step 208, the business management information identified for each BES component is mapped to the element of each BES component. Step 208 allows the framework and internal supporting structure of the BES model 2 to centralize the organization's business management information. In step 210, the business management information is categorized to a standard information structure. In step 215, the business management information is analyzed. In step 218, an intranet site is developed. Steps 215 and 218 describe how the centralized, standardized business management information is analyzed and deployed using simple intranet technology. In step 222, performance measurement criteria are mapped to key result areas (KRAs). Step 222 also defines an approach for integrating this new end-to-end view of an organization's business management information with its performance measurement and reporting systems. In step 232, opportunities for improvement are identified. Activities are described that may be employed by an organization in order to manage and maintain the currency and viability of its business management information and to ensure the integration of the organization's BES with its continuous improvement processes.

During the aforementioned development and deployment activities, the BES model 2 serves as the keystone to the BES development of FIG. 2. The BES model 2 depicts the unique components, elements and priority areas of business management that an organization must address when planning, managing, and executing its business. The BES development method describes the technique for populating these components, elements, and priority areas with the organization's own business management information, using a six-phase approach:

1. Identify (steps 202, 204, and 206)
2. Centralize (step 208)
3. Standardize (step 210)
4. Evaluate (step 215)
5. Enable (step 218)
6. Measure & Improve (steps 222 and 232)

All activities described in the BES development method may be performed by a consultant or specialist role such as:
1. An external business management consultant engaged by an organization.
2. An internal, cross-organizational business management specialist.
3. An internal organizational change specialist.
4. An internal or external business excellence specialist.

In combination, the BES model 2 and the BES development method enable the business management information of an organization to become both available and operational.

The following list illustrates inputs to the BES development method of FIG. 2:
1. BES model 2 of FIG. 1.
2. BES component and element definitions (provided reference above).
3. Current and accurate organizational structure.
4. Cross-organizational business management subject matter experts (SMEs).
5. Cross-organizational business management information (systems, subsystems, policies, and processes).
6. Standard information structure definition (provided in the description of step 210, below).
7. IT infrastructure (to host intranet technology described in step 218).
8. Organizational key result areas (KRAs).

The following list illustrates outputs from the BES development method of FIG. 2:
1. Centralized, standardized business management information.
2. Analyzed and evaluated business management information.
3. Intranet-enabled, end-to-end view of an organization's business management system.
4. Business management system aligned to performance measurement criteria.
5. Business management system reactive to performance results.

Figure 3:
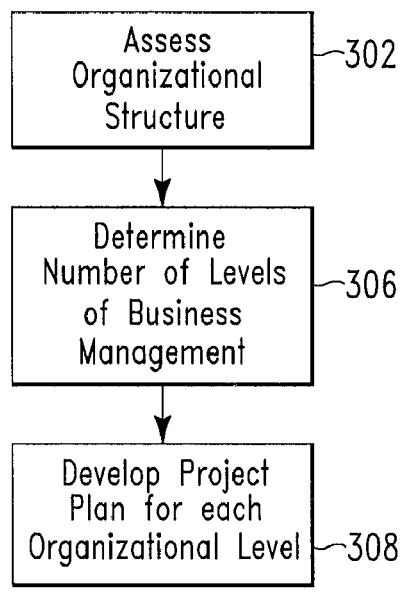
FIG. 3 illustrates a flowchart detailing a first step of the flowchart of FIG. 2, in accordance with embodiments of the present invention.

FIG. 3 illustrates a flowchart detailing step 202 of the flowchart of FIG. 2, in accordance with embodiments of the present invention. In FIG. 3, a consultant assesses the structure and scope of the organization implementing the BES. A primary objective of the flowchart of FIG. 3 is to determine a number of levels of business management that the organization is structured into. The resulting organization structure will typically be groups, areas, or units categorized by either:
1. Geographic location (such as: global or worldwide, region or country).
2. Organizational (administrative) construct.
3. Functional (operational) construct.

In step 302, an organizational structure is assessed. In step 306, a number of levels of business management are determined. In step 308, a project plan for each organizational level is developed.

The following list illustrates inputs to the method illustrated in FIG. 3:
1. BES model 2.
2. BES component and element definitions.
3. Current and accurate organizational structure.

The following list illustrates outputs resulting from executing the method illustrated in FIG. 3.
1. Identification of each organizational unit or business area to be applied to the BES model 2.
2. A total number of business management levels.
3. Project deployment plans for each business management level.

Figure 4:
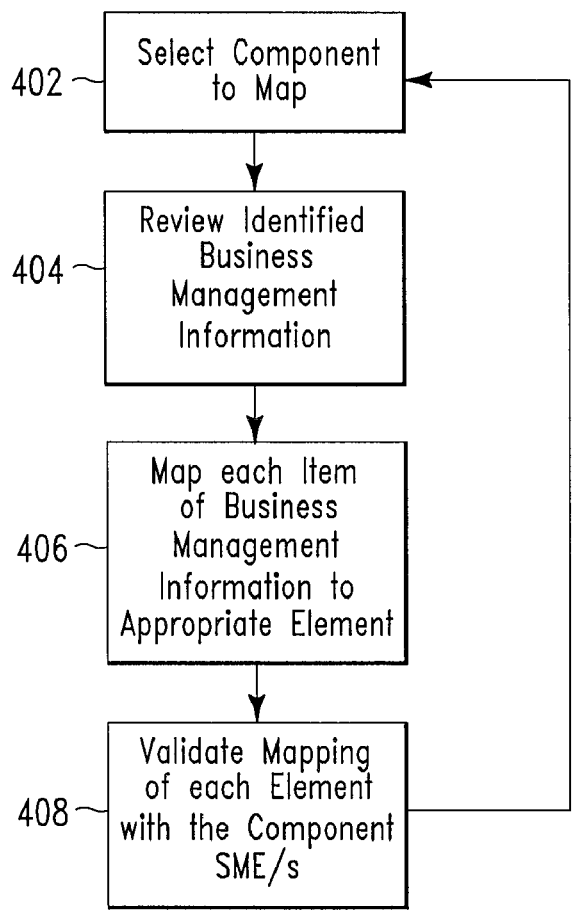
FIG. 4 illustrates a flowchart detailing a second step of the flowchart of FIG. 2, in accordance with embodiments of the present invention.

FIG. 4 illustrates a flowchart detailing step 208 of the flowchart of FIG. 2, in accordance with embodiments of the present invention. The process illustrated in FIG. 4 describes all the activities involved in the "centralize" phase of the BES method of FIG. 2. During this step, the consultant reviews the business management information provided by each component SME and maps the information to the appropriate sub-component (i.e., elements) in the BES Model 2. These elements are a standard set of categories that draw tighter focus around the organization's areas of business management.

In step 402, the consultant systematically selects one of the 16 tier one components, 3 tier two components, or 4 tier two elements to review. In step 404, the business management information identified for each chosen component is reviewed. In step 406, the identified data and information is then mapped to the elements (of the component) that form the internal supporting structure of the BES Model 2 (an example of a breakdown of elements is provided in tables 1-3, infra). In step 408, the mapping is validated with the Component SME. Step 408 provides an opportunity for the consultant and component SME to work together in order to refine the business management information available for each element and to ensure the best possible representation of the business management approach of the organizational unit. In step 410, as each activity sequence (i.e., steps 402 . . . 408) is completed for each component, the consultant will then continue to return to step 402 until all 16 tier one components, 3 tier two components, and 4 tier two elements have been reviewed and mapped. Upon completion the aforementioned process, business management information from across the organization will be centralized into the framework and internal supporting structure of the BES Model 2.

The following example of a breakdown of components and elements is illustrated in tables 1, 2, and 3 as follows:

TABLE 1

| Tier 1 components | Elements | Sub-elements |
|---|---|---|
| Strategy | Business strategy | — |
|  | Strategy leadership | — |
| Planning & Review | Strategic planning | — |
|  | Risk management | — |
|  | Quality assurance |  |
|  | Business investments | — |
| Governance | Authorities & delegations | — |
|  | Business calendar | — |
|  | Governance model | — |
|  | Organization model | Structure & composition |
|  | Policies, directives & guidelines | — |
|  | Roles & responsibilities | — |
|  | Scope of management (SoM) statements | — |
|  | Site management | Employee real estate |

TABLE 1-continued

| Tier 1 components | Elements | Sub-elements |
|---|---|---|
| Environment & Controls | Occupational health & safety | Site operations<br>Site security<br>— |
| | Business controls & compliance<br>Government & legal | Compliance program<br>Compliance issues & metrics<br>Control of non-conformances<br>IT security audits<br>External audits<br>Legislation & regulations |
| | Human resources | Import/Export<br>Optimization |
| People | Resource Operations | Resource deployment (pool management)<br>Utilization<br>Hiring<br>— |
| | Consultation, motivation & recognition | |
| | Working culture | |
| | Training, learning & skills<br>Process management | Training & learning activities<br>Continuous learning & accreditation<br>Skills assessment & development |
| Process | Records management<br>Quality management<br>Program &/or project management system | —<br>—<br>— |
| Programs & Projects | Program &/or project portfolio<br>IT & tools management | —<br>Technology & production baseline |
| Tools & Assets | IT infrastructure management | Technology & configuration planning<br>IT & software tools<br>IT security |
| | Asset management | Change management<br>Incident management<br>Problem management<br>Release management<br>Asset & inventory management |
| | Supplier management (procurement)<br>Products | Asset protection (physical)<br>Order management<br>Supply continuity<br>Supplier communication<br>Supplier communication |
| Products & Services | Service & solution delivery<br>Products | — |
| Client, Market & Growth | Client satisfaction | Account satisfaction<br>Client needs & expectations (set/met)<br>Challenged accounts & projects |
| | Client relationships | Client executive surveys<br>Client retention<br>Complaint management |
| | Product or service development | Development<br>Lifecycle management |
| | Opportunity management<br>Signings (new sales)<br>Growth (existing account business)<br>Contracts & negotiations | Opportunity management<br>—<br>—<br>— |
| | Marketing | Market competitiveness & intelligence<br>Market share<br>Market planning<br>Marketing & image |
| | Business reputation | Referenceable clients<br>Benchmarking |
| | Community impact | Environmental impact<br>Consultation<br>Giveback |
| Financial Management | Financial management & planning | Profitability<br>Capital management<br>Acquisition & disinvestment<br>Financial planning<br>Financial labor management<br>Productivity & cost takeout |

TABLE 1-continued

| Tier 1 components | Elements | Sub-elements |
| --- | --- | --- |
|  | Financial reporting | — |
|  | Cost & spending management | Cost & spending planning |
|  |  | Cost & spending model |
| Performance | Information management | — |
| Measurement | Performance indicators | — |
|  | Performance measurement model | — |
| Results & Analysis | Business (operational) reporting system | — |
|  | Business results & analysis | — |

TABLE 2

| Tier 1 supporting components | Elements |
| --- | --- |
| Communication | Employee communications (horizontal communications) |
|  | Feedback & comment (vertical communications) |
| Continuous Improvement | Business Excellence |
|  | Continuous improvement |
|  | Corrective & preventative action |
| Innovation | Intellectual capital & reuse |
|  | Knowledge management |
|  | Innovation |
|  | Transformation |

TABLE 3

| Tier 2 components | Elements |
| --- | --- |
| Strategy & Planning | — |
| Management Reviews | — |
| Reporting | — |
| Cross-organizational Priorities | Shareholder value |
|  | Shareholder return |
|  | Good corporate citizen |
|  | Culture & values |

Figure 5B:
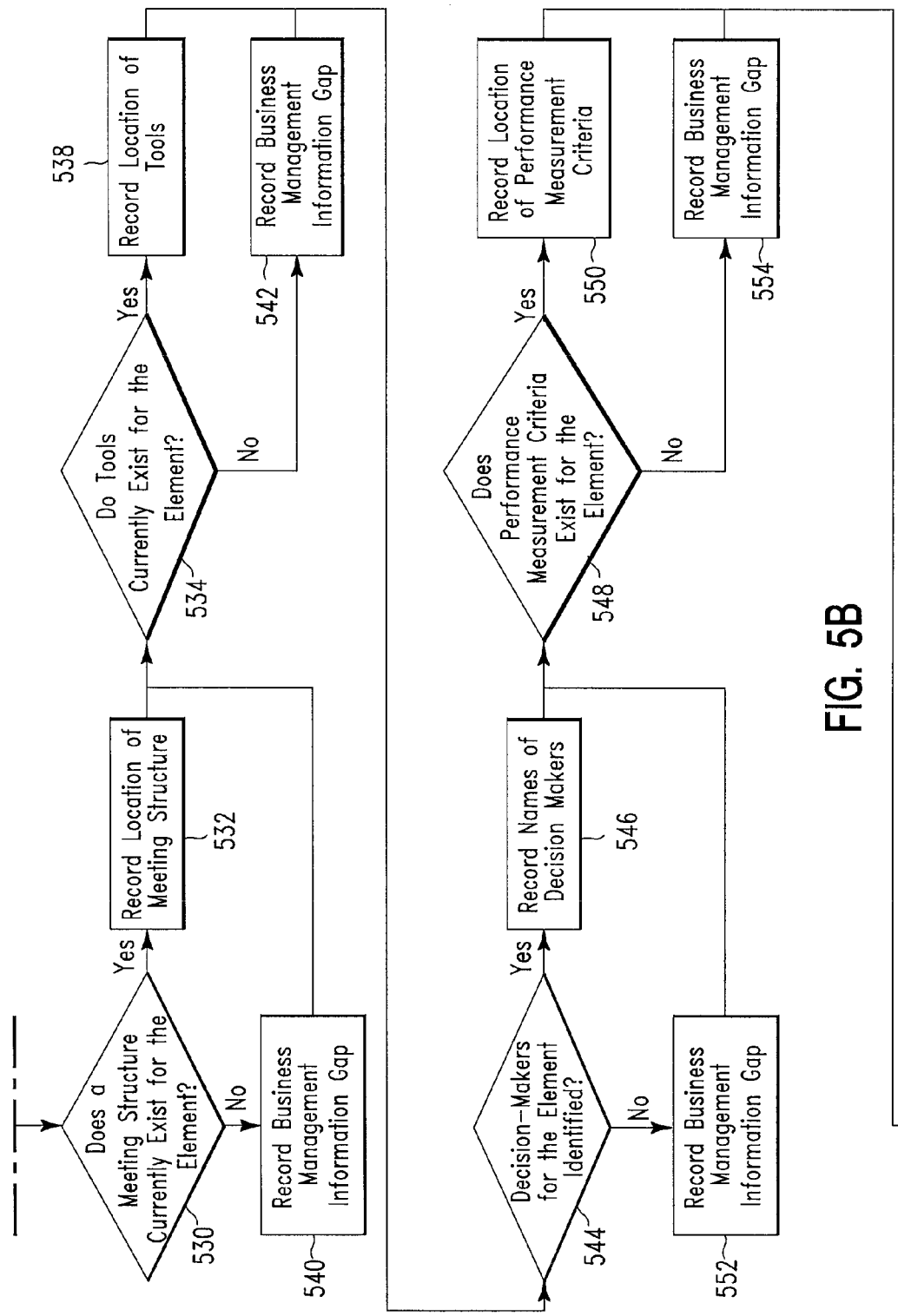
Figure 5C:
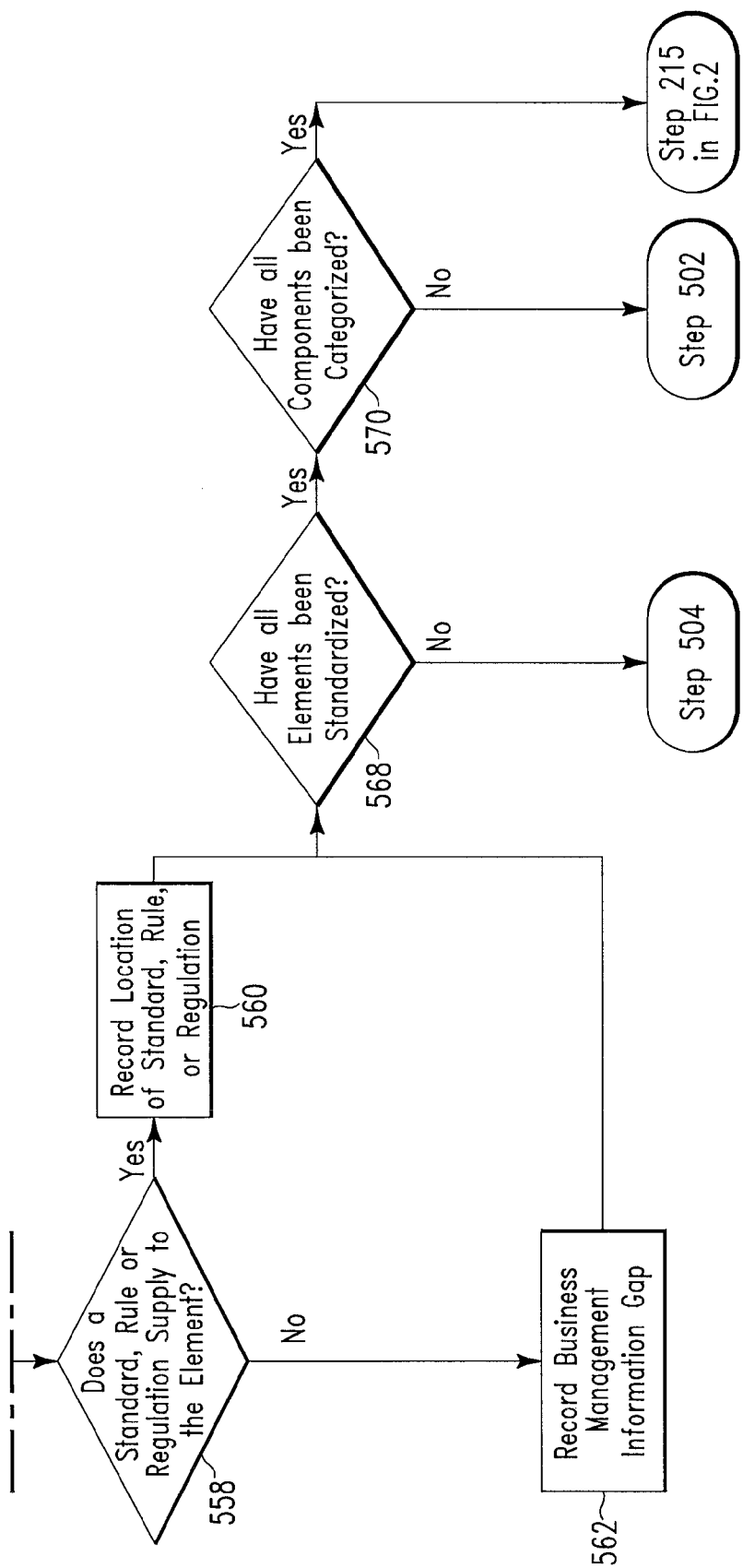

FIGS. 5A-5C illustrate a flowchart detailing step 210 of the flowchart of FIG. 2, in accordance with embodiments of the present invention. The process illustrated FIGS. 5A-5C describe all the activities involved in the "Standardize" phase of the BES method of FIG. 2. A primary objective of this process is to standardize the organization's business management information into a common form and structure. By using a standard format to categorize an organization's business management information, organizational units across the greater organization may easily identify, review, compare, adapt, and/or reuse the systems, policies, processes and/or tools developed in other organizational units or business areas. During this process, the consultant reviews the business management information of each component as mapped to the appropriate elements of the component. The consultant systematically selects one of the 16 tier one components or 3 tier two components to review, and then narrows the focus to each element. For every element, the consultant reviews and records the current existence or lack of business management information for each item in the BES standard information structure. The BES standard information structure comprises a unique structure of types of business management information that is applied to every element within every component of the BES. It provides a common structure to the business management information located across and through all levels of an organization.

The BES standard information structure comprises 9 items:
1. Policy
2. Standard Rule or Regulation
3. System or Method
4. Plan
5. Process, Procedure or Work Instruction
6. Tools
7. Meeting Structure
8. Decision Makers
9. Performance Measurement In step 502, components to categorize are selected. In step 504, an element to standardize is selected. In step 506 mapped business management information is reviewed. In step 508, it is determined if a policy currently exists for the element. If in step 508, it is determined that a policy currently exists for the element then in step 510, a location of the policy is recorded. If in step 508, it is determined that a policy does not currently exist for the element then in step 512, a business management information gap is recorded. In step 514, it is determined if a system or method currently exists for the element. If in step 514, it is determined that a system or method currently exists for the element then in step 516, a location of the system or method is recorded. If in step 514, it is determined that a system or method does not currently exist for the element then in step 518, a business management information gap is recorded. In step 520, it is determined if plans currently exist for the element. If in step 520, it is determined that plans currently exist for the element then in step 524, a location of plans is recorded. If in step 520, it is determined that plans do not currently exist for the element then in step 521, a business management information gap is recorded. In step 526, it is determined if process, procedural, or work instruction information currently exists for the element. If in step 526, it is determined that process, procedural, or work instruction information currently exists for the element then in step 528, a location of process, procedural or work instruction information is recorded. If in step 526, it is determined that process, procedural, or work instruction information does not currently exist for the element then in step 529, business management information gap is recorded. In step 530, it is determined if a meeting structure currently exists for the element. If in step 530, it is determined that a meeting structure currently exists for the element then in step 532, a location of the meeting structure is determined. If in step 530, it is determined that a meeting structure does not currently exist for the element then in step 540, a business management information gap is recorded. In step 534, it is determined if tools currently exist for the element. If in step 534, it is determined that tools currently exist for the element then in step 538, a location of the tools is recorded. If in step 534, it is determined that tools currently do not currently exist for the element then in step 542, a business management information gap is recorded. In step 544, decision-makers for the element are identified. If in step 544, decision-makers for the element are identified then in step 546 names of the decision-makers are recorded. If in step 544, decision-makers for the element are not identified then in step 552, a business management information gap is recorded. In step 548, it is determined if performance measurement criteria exists for the element. If in step 548, it is determined that performance measurement criteria exists for the element then in step 550, a location of the performance measurement criteria is recorded. If in step 548, it is determined that performance measurement criteria does not exist for the element then in step 554, a business management information gap is recorded. In step 558, it is determined if a standard, rule, or regulation applies to the element. If in step 558, it is determined that a standard, rule, or regulation applies to the element then in step 560, a location of the standard, rule, or regulation is recorded. If in step 558, it is determined that a standard, rule, or regulation does not apply to the element then in step 562, a business management information gap is recorded. In 568, it is determined if all elements been standardized. If in step 568, it is determined that all elements have not been standardized then step 504 is repeated. If in step 568, it is determined that all elements have been standardized then in step 570 it is determined if all components have been categorized. If in step 570 it is determined that all components have not been categorized then step 502 is repeated. If in step 570 it is determined that all components have been categorized then the process executes step 215 of FIG. 2.

Figure 6:
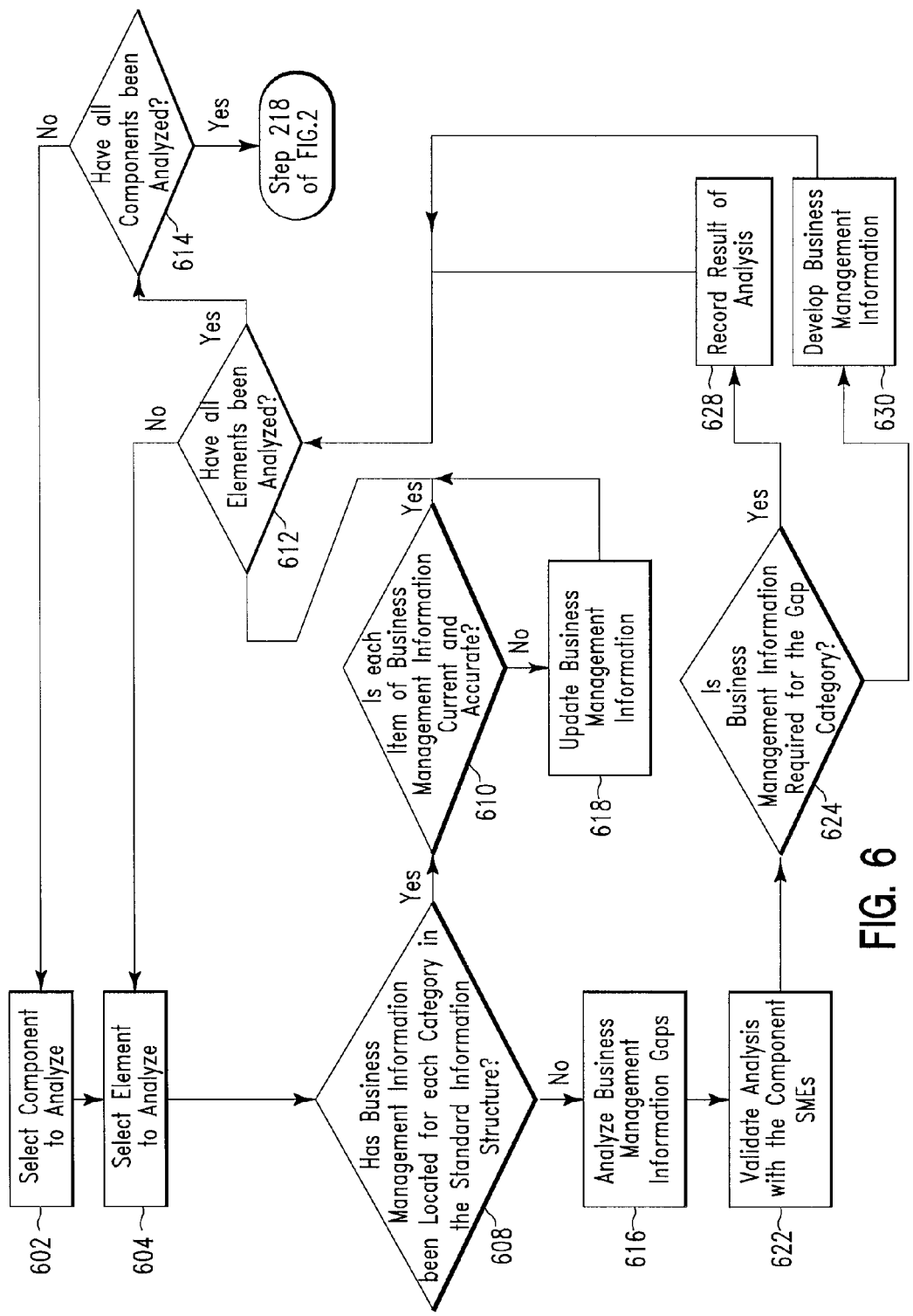
FIG. 6 illustrates a flowchart detailing a fourth step of the flowchart of FIG. 2, in accordance with embodiments of the present invention.

FIG. 6 illustrates a flowchart detailing step 215 of the flowchart of FIG. 2, in accordance with embodiments of the present invention. The process illustrated in FIG. 6 describes all the activities involved in the in the "Evaluate" phase of the BES method of FIG. 2. During this process, the consultant evaluates the business management information of the organization that has been centralized and standardized. The prime objective of the evaluation is to ensure the consistent provision, via the BES, of business management information that is:

1. Clearly defined.
2. Easily identified.
3. Current and accurate.
4. Accessible and available.
5. Provides timely data and information to decision-makers.
6. Satisfies the requirements of all other stakeholders.

Where business management information gaps or deficiencies are located, the consultant works with the component SME in order to determine whether the gap is by omission or by design and whether the viability and sustainability of the organization is at risk if the gap remains. Where it is determined that business management information is required or requires updating or other amendment, the consultant transfers the requirement into the organization's business information development process (in order to develop, purchase, or otherwise acquire the required documentation, tools, skills, or other resources to close the gap or remediate the deficiency).

In step 602, a BES component is selected to analyze. In step 604, an element of the selected BES component is further selected to analyze. In step 608, it is determined if business management information been located for each category in the standard information structure.

If in step 608, it is determined that business management information has not been located for each category in the standard information structure then in step 616, business management information gaps are analyzed. In step 622, analysis with the component SME/s is validated. In step 624, it is determined if business management information is required for the gap categories. If in step 624, it is determined that business management information is required for the gap categories then in step 630, business management information is developed and step 612 is executed as described, infra. If in step 624, it is determined that business management information is not required for the gap categories then in step 628, a result of the analysis is recorded and step 612 is executed as described, infra.

If in step 608, it is determined that business management information has been located for each category in the standard information structure then in step 610, it is determined if each item of business management information is current and accurate. If in step 610, it is determined that each item of business management information is not current and accurate then in step 618, the business management information is updated and step 612 is executed as described, infra. If in step 610, it is determined that each item of business management information is current and accurate then in step 612 it is determined if all elements have been analyzed. If in step 612, it is determined that all elements have not been analyzed then step 604 is repeated. If in step 612, it is determined that all elements have been analyzed then in step 614, it is determined if all components have been analyzed. If in step 614 it is determined that all components have not been analyzed then step 602 is repeated. If in step 614 it is determined that all components have been analyzed then the process executes step 218 of FIG. 2.

Figure 7:
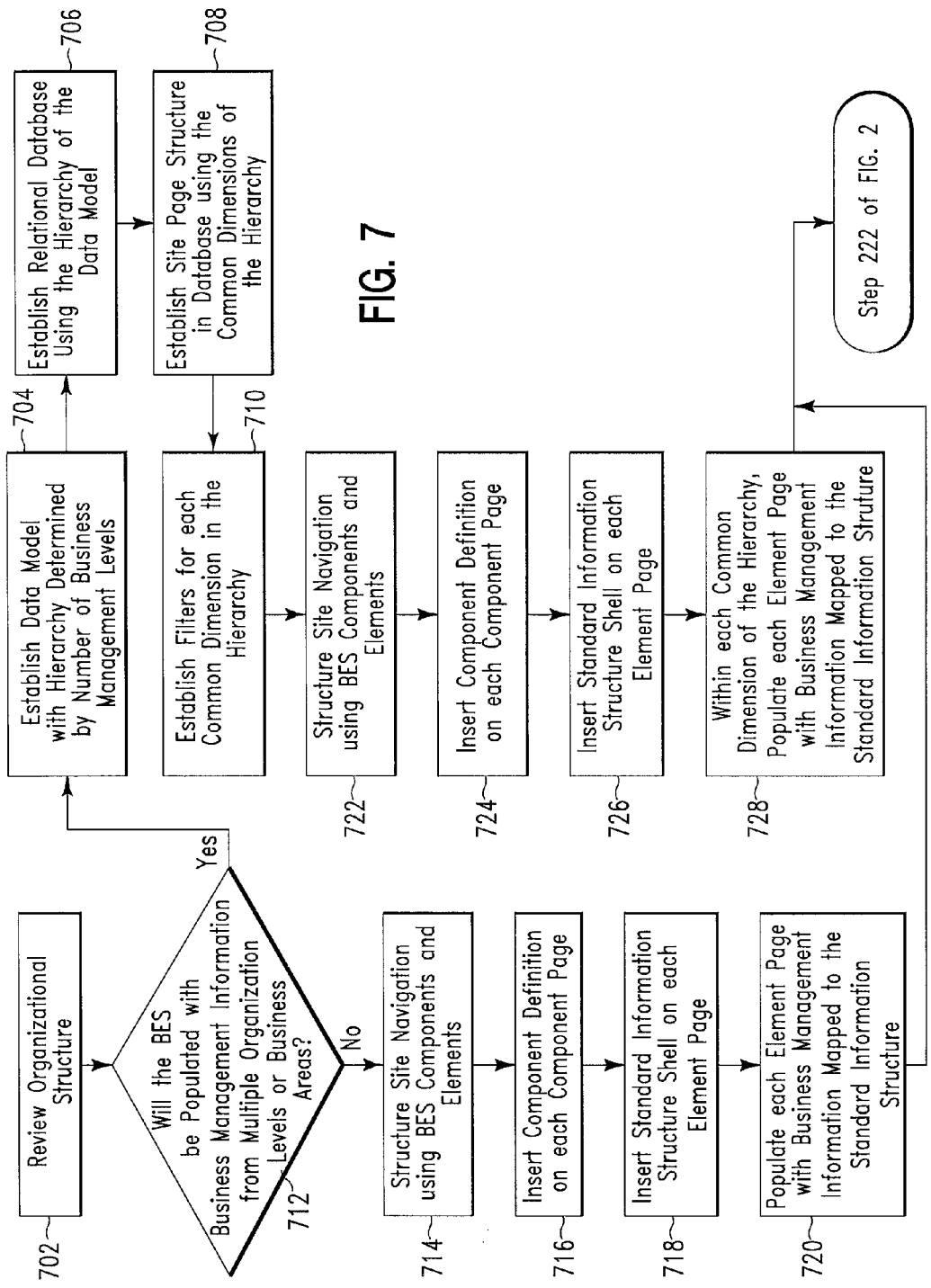
FIG. 7 illustrates a flowchart detailing a fifth step of the flowchart of FIG. 2, in accordance with embodiments of the present invention.

FIG. 7 illustrates a flowchart detailing step 218 of the flowchart of FIG. 2, in accordance with embodiments of the present invention. The process illustrated in FIG. 7 describes all the activities involved in the "Enable" phase of the BES method of FIG. 2. In this process, the business management levels determined in step 202 are translated directly into the navigational structure of an intranet site that uses the BES Model 2 of FIG. 1 as its central focus. If an organization is deploying more than one level of business management, a total number of levels translate directly to the number of common dimensions that will be required in the hierarchy of the organization's intranet site and back-end database. The common dimensions will typically be organizational groups, areas, or units categorized by:

1. Geographic location (e.g., global or worldwide, region, country, etc).
2. Organizational (administrative) construct.
3. Functional (operational) construct.

Figure 8:
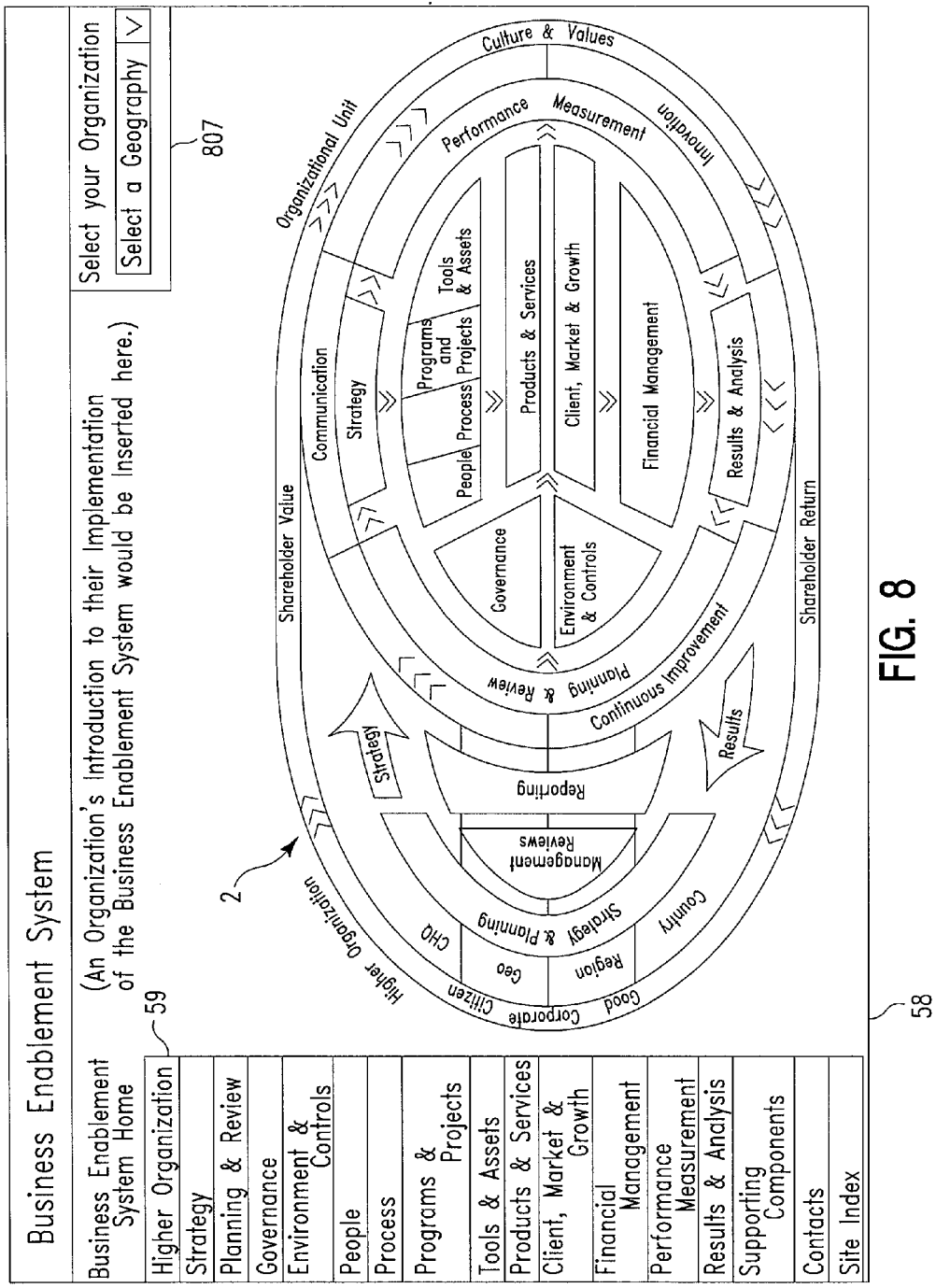
FIG. 8 illustrates an example of an intranet site developed by the process illustrated in the flowchart of FIG. 7, in accordance with embodiments of the present invention.

In the example intranet site illustrated in FIG. 8, infra, the common dimension used by the organization is geography, however, an organization could use any combination of the above three categories.

In step 702, the organizational structure is reviewed. In step 712 it is determined if the BES will be populated with business management information from multiple organizational levels or business areas.

If in step 712 it is determined that the BES will not be populated with business management information from multiple organizational levels or business areas then in step 714, a site navigation structure is developed using BES components and elements. In step 716, a component definition is inserted on each component page. In step 718, a standard information structure shell is inserted on each element page. In step 720, each element page is populated with business management information mapped to the standard information structure and the process executes step 222 of FIG. 2.

If in step 712 it is determined that the BES will be populated with business management information from multiple organizational levels or business areas then in step 704, a data model is established with hierarchy determined by the number of business management levels. In step 706, a relational database using the hierarchy of the data model is established. In step 708, a site page structure is established in the database using the common dimensions of the hierarchy. In step 710, filters for each common dimension in the hierarchy are established. In step 722, structure site navigation is developed using BES components and elements. In step 724, component definitions are inserted on each component page. In step 726 a standard information structure shell is inserted on each element page. In step 728, each element page is populated with business management information mapped to the standard information structure and the process executes step 222 of FIG. 2.

FIG. 8 illustrates an example of a BES intranet site 58 developed by the process illustrated in the flowchart of FIG. 7, in accordance with embodiments of the present invention. BES intranet site 58 illustrates the components of an interactive BES model (i.e., the BES Model 2 of FIG. 1) as the focus of an intranet home page. Additionally, the BES intranet site 58 illustrates an example of an organizational filter 807. Additionally, the BES intranet site 58 illustrates a navigation panel 59. When a user selects an organizational filter element, the user would be presented with business management information filtered for the selected organization. When a user selects a component from either the BES Model 2 or the navigation panel 59, the user would be presented with a definition of the selected component and a breakdown of the selected component into its elements for the selected organization per the filter 807.

Figure 9:
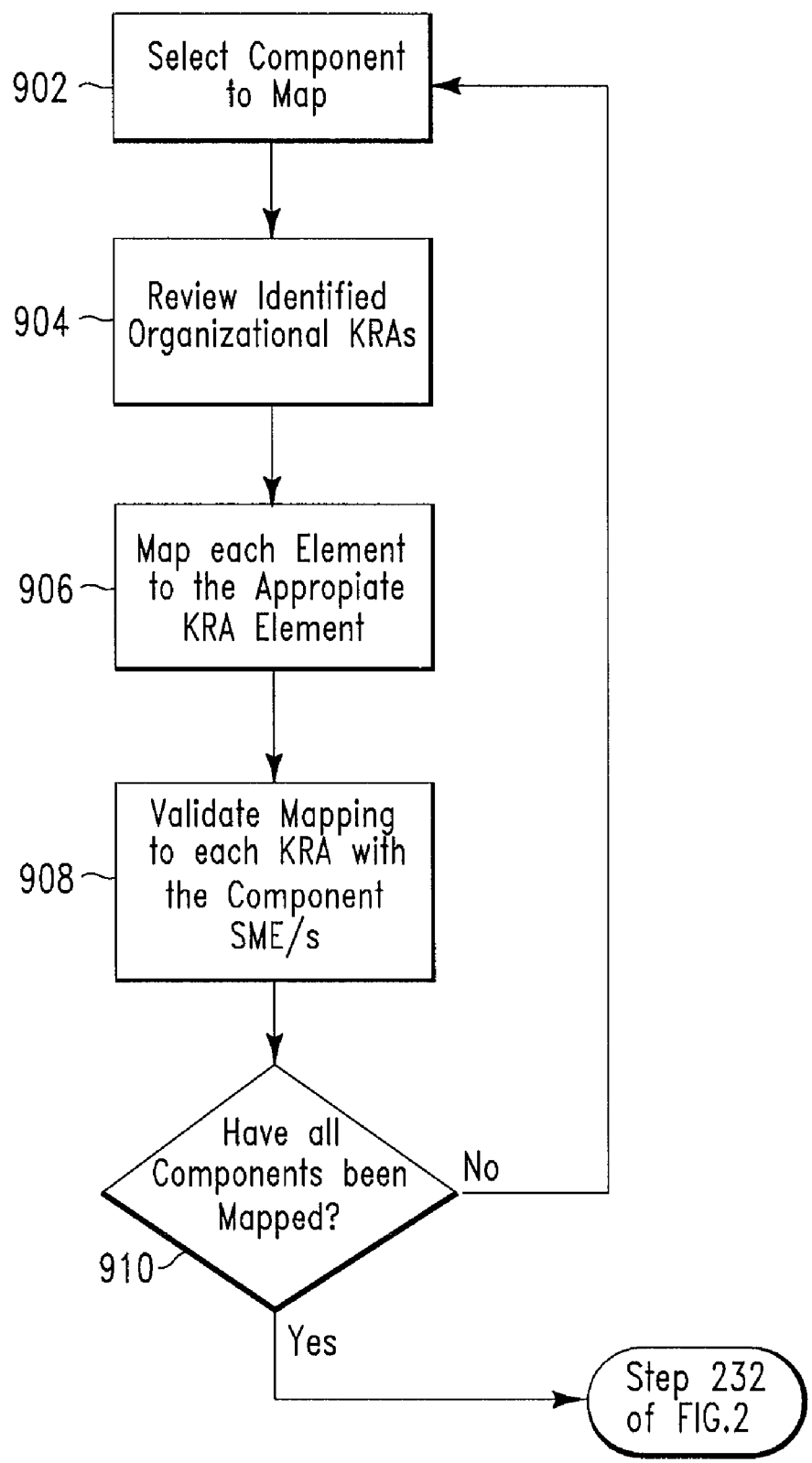
FIG. 9 illustrates a flowchart detailing a sixth step of the flowchart of FIG. 2, in accordance with embodiments of the present invention.

FIG. 9 illustrates a flowchart detailing step 222 of the flowchart of FIG. 2, in accordance with embodiments of the present invention. In FIG. 9, performance measurement criteria are mapped to key result areas (KRAs). This mapping facilitates a direct connection between the business management information of an organization and its actual measured performance. The key result areas (KRAs) comprise performance measurement categories that appear on the organization's business performance scorecard. The five KRAs identified in the Strategic Enablement Method are:
1. Client, Market & Growth
2. Environment & Controls
3. Financial Management
4. Operations, Innovation & Improvement
5. People & Team By assigning each element of an organization's BES to KRAs, alignment between an organization's business management information and its performance measurement may be directly drawn. An organization may then review and assess its current performance using the KRAs on its organizational scorecard and easily identify the business management information that describes and directs the activities and behaviors associated with the current level of performance. Where the current level of performance requires improvement, the organization may immediately identify the business management information requiring review and improvement. This direct alignment of business management information to performance measurement provides the organization with: an ability to measure the success of the implementation of systems, policies, processes and tools; comparable historical data for assessment when systems, policies, processes or tools are changed; and a means to quickly identify areas of the business that may have too little or too much business management information. Additionally, the application of KRAs to an organization's BES enables the organization to quantifiably measure its continuous improvement processes. As KRAs are assigned to each element within the BES, improvements may be evident in the KRAs aligned to the BES element, providing the organization with a standardized, centralized set of measurement criteria for every business process.

In step 902, a BES component is selected to map. In step 904 organizational KRAs are reviewed. In step 906, each element of the selected component is mapped to the appropriate KRA element. In step 908 the mapping to each KRA is validated with the component SME/s. In step 910, it is determined if all components have been mapped. If in step 910, it is determined that all components have not been mapped then step 902 is repeated. If in step 910 it is determined that all components have been mapped then the process executes step 232 of FIG. 2.

Figure 10:
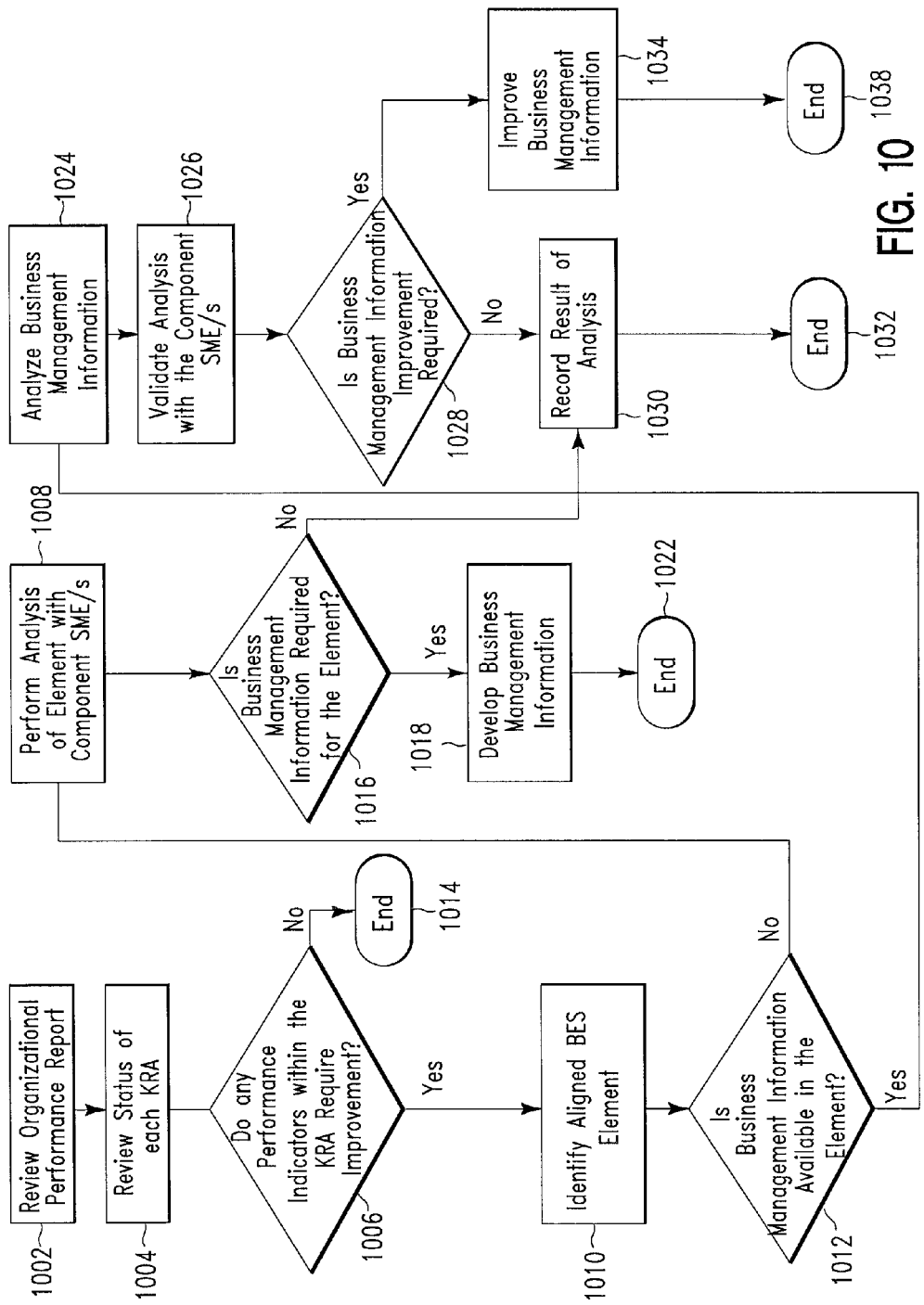
FIG. 10 illustrates a flowchart detailing a seventh step of the flowchart of FIG. 2, in accordance with embodiments of the present invention.

FIG. 10 illustrates a flowchart detailing step 232 of the flowchart of FIG. 2, in accordance with embodiments of the present invention. In the process of FIG. 10, the organization uses the outputs of its performance measurement process and its reporting and analysis systems in order to identify areas where review and improvement of its business management information is required.

In step 1002, organizational performance reports are reviewed. In step 1004, reported status of each KRA is reviewed. In step 1006, it is determined if any performance indicators within the KRA require improvement. If in step 1006, it is determined that there are no performance indicators within the KRA that require improvement then the process ends in step 1014. If in step 1006, it is determined that there are performance indicators within the KRA that require improvement then in step 1010, an aligned BES element is identified. In step 1012, it is determined if business management information is available in the element.

If in step 1012, it is determined that business management information is available in the element then in step 1024, the business management information is analyzed. In step 1026, the analysis of step 1024 is validated with the component SME/s. In step 1028, it is determined if business management information improvement is required. If in step 1028, it is determined that business management information improvement is required then in step 1034, a business information improvement process is initiated and the process ends in step 1038. If in step 1028, it is determined that business management information improvement is not required then in step 1030 results of the analysis is recorded and a report comprising the results may be generated. The report may be transmitted to a user for review, displayed on a monitoring device (e.g., a computer monitor), printed on a printing device (e.g., a printer), or stored within a storage device (e.g., a computer readable memory device, a file cabinet, etc). The process ends in step 1032.

If in step 1012, it is determined that business management information is not available in the element then in step 1008, an analysis of the element is performed with component SME/s. In step 1016, it is determined if business management information is required for the element. If in step 1016, it is determined that business management information is not required for the element then step 1030 is executed as described, supra. If in step 1016, it is determined that business management information is required for the element then in step 1018, business management information is developed. The process ends in step 1022.

Figure 11:
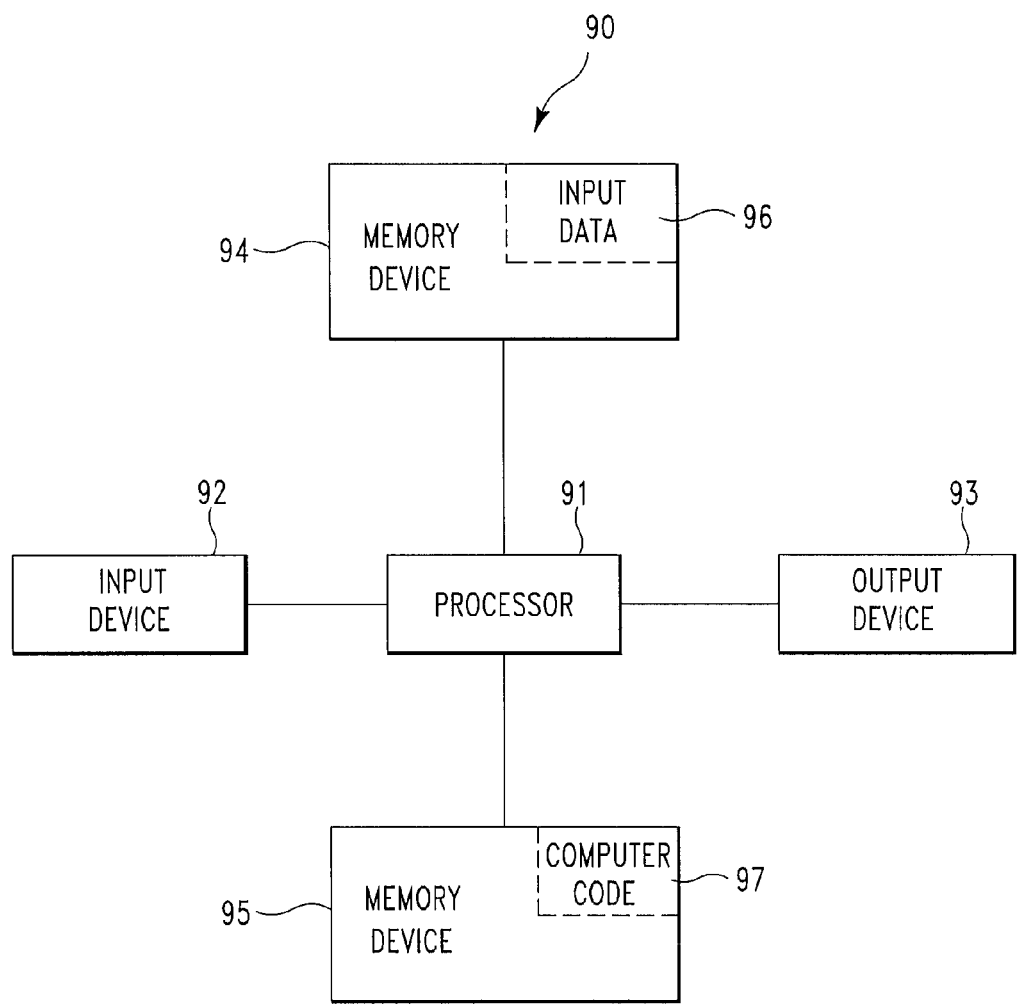
FIG. 11 illustrates a computer apparatus used for deploying an organization's intranet site as described with reference to FIGS. 7 and 8 and a development method that provides an organization with a holistic end-to-end view of the systems, subsystems, policies, and processes that constitute the business management system of the organization, in accordance with embodiments of the present invention.

FIG. 11 illustrates a computer apparatus 90 used for deploying an organization's intranet site as described with reference to FIGS. 7 and 8 and the development method described above that provides an organization with a holistic end-to-end view of systems, subsystems, policies, and processes that constitute a business management system of the organization, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms for deploying an organization's intranet site as described with reference to FIGS. 7 and 8 and the development method described above that provides an organization with a holistic end-to-end view of systems, subsystems, policies, and processes that constitute a business management system of the organization. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 11) may comprise the algorithms and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

Still yet, any of the components of the present invention could be deployed, managed, serviced, etc. by a service provider who offers to deploy an organization's intranet site as described with reference to FIGS. 7 and 8 and the development method described above that provides an organization with a holistic end-to-end view of systems, subsystems, policies, and processes that constitute a business management system of the organization. Thus the present invention discloses a process for deploying or integrating computing infrastructure, comprising integrating computer-readable code into the computer system 90, wherein the code in combination with the computer system 90 is capable of performing a method for deploying an organization's intranet site as described with reference to FIGS. 7 and 8 and development method that provides an organization with a holistic end-to-end view of systems, subsystems, policies, and processes that constitute a business management system of the organization. In another embodiment, the invention provides a business method that performs the process steps of the invention on a subscription, advertising, and/or fee basis. That is, a service provider, such as a Solution Integrator, could offer to deploy an organization's intranet site as described with reference to FIGS. 7 and 8 and development method that provides an organization with a holistic end-to-end view of systems, subsystems, policies, and processes that constitute a business management system of the organization. In this case, the service provider can create, maintain, support, etc. a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 11 shows the computer system 90 as a particular configuration of hardware and software, any configuration of hardware and software, as would be known to a person of ordinary skill in the art, may be utilized for the purposes stated supra in conjunction with the particular computer system 90 of FIG. 11. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for generating a business management system intranet site within a computing system comprising a computer processor, said business management system associated with a business, said method comprising:

identifying and retrieving business management data associated with a business management model of said business;

first identifying from said business management data, an organizational structure of said business, wherein said organizational structure comprises components and elements, wherein the elements are comprised by said components, wherein said components comprise first tier components and second tier components, wherein said first tier components comprise first associated elements of said elements, wherein said second tier components comprise second associated elements of said elements, wherein said first tier components comprise a strategy component, a planning and review component, a governance component, an environment component, and a programs component, wherein said first associated elements comprise a business strategy element of said strategy component, a risk management element of said planning and review component, an organizational element of said governance component, an occupational health and safety element of said environment component, and an IT and tools management element of said programs component, wherein said second tier components comprise a cross-organizational priorities component, and wherein said second associated elements comprise a shareholder value element and a shareholder return element of said cross-organizational priorities component;

second identifying subject data for said business, wherein said subject data comprises data retrieved from members of said business capable of defining said components of said business management model;

third identifying, by said computer processor, a location within a memory device for said components of said business management model, said memory device comprised by said computing system;

first mapping, by said computer processor of said computing system, information associated with said components to said elements;

categorizing and standardizing said business management data by;

selecting a first element of a first component of said components and determining whether business management information exists for said first element, wherein based on a determination that the business management information does exist for said first element, determining and recording a location within said memory device for a policy associated with said first element;

determining and recording a location within said memory device for a system associated with said first element;

determining and recording a location within said memory device for a plan associated with said first element;

determining and recording a location within said memory device for a process or work instructional information associated with said first element;

determining and recording a location within said memory device for a meeting structure associated with said first element;

determining and recording a location within said memory device for tools associated with said first element;

determining and recording a location within said memory device for decision makers associated with said first element;

determining and recording a location within said memory device for performance measurement criteria associated with said first element;

determining and recording a location within said memory device for a rule associated with said first element, and wherein based on the determination that the business management information does not exist for said first element, recording an information gap in the business management model;

identifying, by the computer processor, a location of data associated with said information gap;

retrieving said data from the memory device;

validating that said data is required for said business management model;

determining and recording a location within said memory device for said data;

repeating said categorizing and said standardizing for each component of said components and each element of said components until all said components and said elements have been standardized;

developing a navigational structure for an intranet viewable business management model by:

determining, by said computer processor, a site hierarchy based on a number of business management levels and and organizational groups categorized by a geographical location and associated with said organizational structure, said business management levels comprising said first tier components and said second tier components;

generating, by said computer processor, a relational database using said hierarchy;

generating, by said computer processor, a site page structure in said relational database using said organizational groups associated with said hierarchy;

generating, by said computer processor, filters for each of said organizational groups;

mapping, by said computer processor, said components and said standardized elements to said intranet viewable business management model;

generating, by said computer processor, site structure navigation using said components and said standardized elements;

receiving, by said computer processor, said business management data and said business management model;

generating and displaying, by said computer processor in response to said receiving said business management data and said business management model, said intranet viewable business management model of said business management data mapped to said business management model, wherein said intranet viewable business management model comprises a user selectable navigation panel for selecting said components and said elements;

selecting, by said computer processor, from said user selectable navigation panel in response to a selection by the user, a first component of said components;

second mapping, by said computer processor based on said first selecting, said business management data to key result areas of said business;

receiving, from said computer processor in response to results of said second mapping, reports comprising said business management data mapped to said key result areas of said business;

reviewing said reports to determine a status of said business management data;

revising, by said computer processor in response to said selecting said first component, said second mapping, said receiving said reports, and said determining said status, said business management data; and displaying, by said computer processor, said revised business management data to a user.

2. The method of claim 1, wherein said business management data is retrieved from said business management model.

3. The method of claim 2, wherein said business management model comprises a graphical model in a graphics format.

* * * * *